Figure 1:
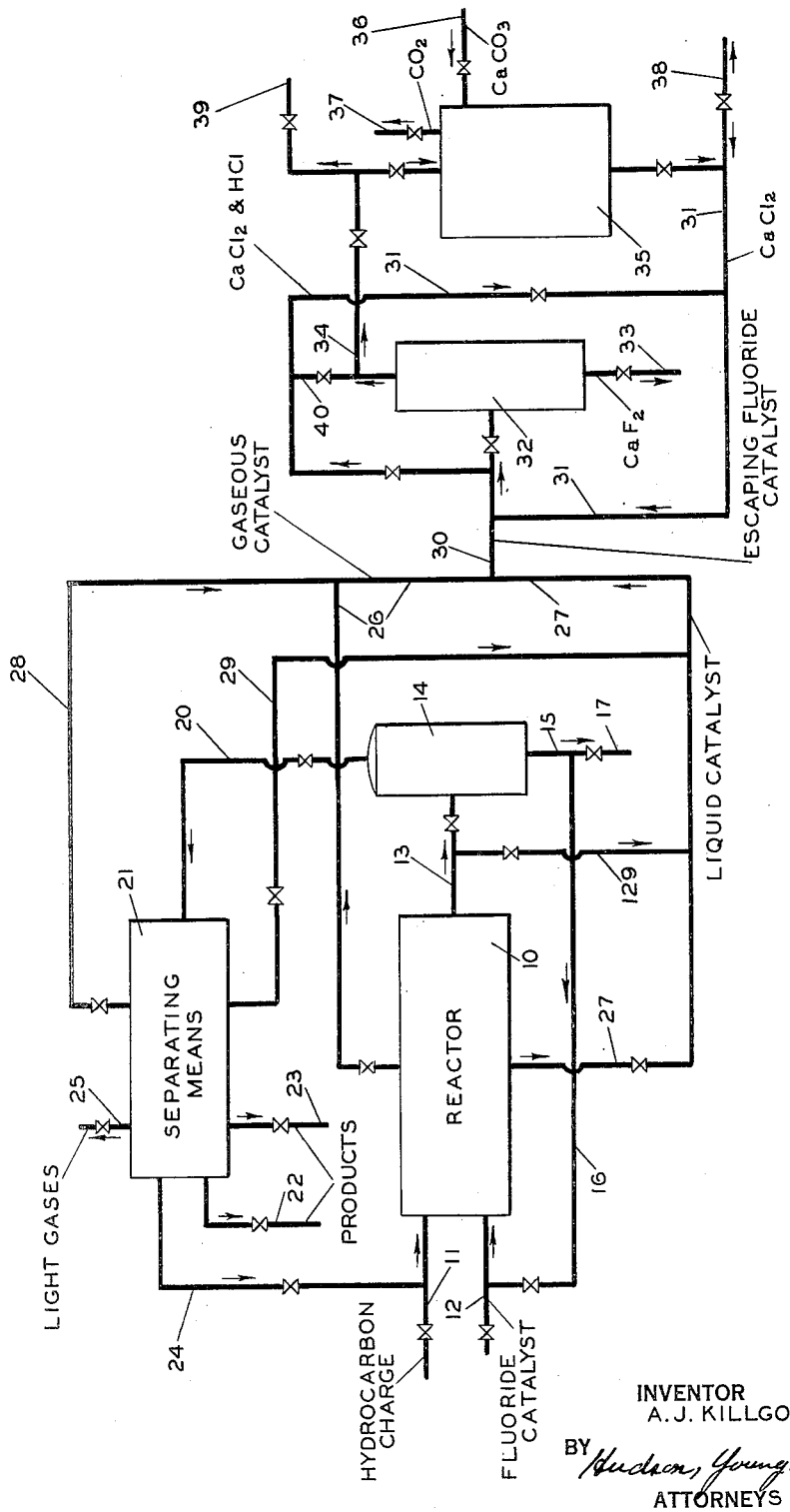

May 16, 1950        A. J. KILLGORE        2,507,603

RENDERING INNOCUOUS FLUID FLUORIDE CATALYST

Filed Dec. 14, 1943        2 Sheets-Sheet 1

INVENTOR
A. J. KILLGORE
BY Hudson, Young & Yinger
ATTORNEYS

May 16, 1950 A. J. KILLGORE 2,507,603
RENDERING INNOCUOUS FLUID FLUORIDE CATALYST
Filed Dec. 14, 1943 2 Sheets-Sheet 2

INVENTOR
A. J. KILLGORE
BY *Hudson, Young & Ginger*
ATTORNEYS

Patented May 16, 1950

2,507,603

UNITED STATES PATENT OFFICE 2,507,603

RENDERING INNOCUOUS FLUID FLUORIDE CATALYST

Anthony J. Killgore, Clay County, Mo., assignor to Phillips Petroleum Company, a corporation of Delaware Application December 14, 1943, Serial No. 514,288

8 Claims. (Cl. 23—88)

This invention relates to the neutralization of fluid fluoride catalysts. In specific modifications this invention relates to the protection of personnel and of equipment connected with the operation of a conversion plant in which is used a fluid fluoride catalyst such as hydrofluoric acid, boron trifluoride, mixtures comprising hydrofluoric acid and boron trifluoride, catalytic complexes comprising one or both of these materials such as the complex resulting from saturating, with boron trifluoride, water, alcohols, acids of phosphorus and the like, and antimony trifluoride.

In the course of operating a plant employing a fluid fluoride catalyst it is inevitable that a certain amount of the catalyst will escape. Such escaping will occur through leaks around valve stems, leaks through pump packings, when residual catalyst is present in equipment which is removed from operation and opened to the atmosphere, when equipment unavoidably breaks, and the like. This escaping catalyst is not identical with catalyst which is removed from the system for regeneration since such regeneration occurs in equipment designed for that purpose. The escaping catalyst may escape as a gas, particularly when the catalyst comprises hydrogen fluoride or boron trifluoride, or may escape as a liquid as when hydrogen fluoride is used at a low temperature, when a complex of boron trifluoride and water or other inorganic compounds is used, or when it is possible to flush leaking equipment with water. It has been found that such catalysts present hazards not found with other catalysts such as sulfuric acid, phosphoric acid and the like, in that the fluoride ion produces extremely deep, persistent and painful burns when such fluoride catalysts come into contact with the human skin. Thus hydrofluoric acid has a double action on the skin, the burn resulting directly from the acid and the pain and subsequent complications resulting from penetration of the fluoride ion into the skin and tissues of the human body. These burns result not only from direct contact of a fluoride catalyst with the body, but also from handling tools which have come into contact with the acid, and it has been found that such tools will produce burns even after a somewhat thorough washing with ordinary water.

It has been found that careful design of equipment and handling of the equipment by the personnel involved will eliminate, or at least greatly reduce, personnel hazards when a fluid fluoride catalyst is used in a conversion plant. The design of the equipment which will result in protection includes providing vapor lines and connections through which any escaping vapors from leaks, such as those above enumerated, can be withdrawn from enclosed conduits and providing suitable means for promptly flushing with water equipment upon which such a fluid catalyst may have been spilled. However, it is necessary to neutralize such escaping catalyst. Heretofore it has been the practice to contact escaping catalyst with a neutralizing agent such as lime or with limestone whereby the catalyst reacts to produce the insoluble calcium fluoride. However, since lime and calcium carbonate are not highly soluble in water the contacting has often been incomplete and the insoluble calcium fluoride resulting from the neutralization becomes mixed with unreacted calcium hydroxide or calcium carbonate so that when the calcium fluoride is discarded or treated to recover the fluoride, as by reaction with sulfuric acid to produce hydrogen fluoride, the calcium fluoride is associated with substantial amounts of unreacted neutralizing agent.

It is an object of this invention to neutralize a fluid fluoride catalyst.

It is a further object of this invention to neutralize an escaping fluid fluoride catalyst from a conversion plant with a minimum of consumption of neutralizing material.

A further object of this invention is to provide apparatus for the protection of personnel from escaping fluid fluoride catalyst.

Still another object of this invention is to provide for the safe and efficient disposal of hydrofluoric acid escaping from a plant in which hydrocarbons are converted in the presence of a hydrofluoric acid catalyst.

Further objects and advantages of my invention will become apparent, to one skilled in the art, from the accompanying disclosure and discussion.

I have found that the neutralization of such a fluid fluoride catalyst may be quickly and economically effected by contacting the catalyst with a solution of a salt of a halide, other than the fluoride, of a metal of the group consisting of magnesium, calcium, strontium, and barium. I have further found that efficient and economical neutralization of such a catalyst may be effected by providing a large volume of an aqueous solution of such a metal halide circulating in a closed cycle such as a trough or flume placed at a low spot of the conversion plant area, providing a conduit or conduits whereby escaping gaseous or liquid catalyst is mixed with the circulating solution whereby the fluoride of the metal is formed and precipitated, removing the precipitated metal fluoride from the circulating solution, withdrawing a portion of the circulating solution and contacting the withdrawn solution with a carbonate of the metal to regenerate the solution, and returning the regenerated solution to the cycle. It is preferred that the circulating solution contain a substantial excess of the metal halide over that which will be necessary to react with the escaping catalyst. I prefer to use as a metal halide solution a solution of calcium chloride, although, of course, the bromide or the iodide may be used. In some instances it will also be possible to use, without too much expense, a solution of magnesium chloride together with the corresponding magnesium carbonate. In most instances the other metals mentioned, although more or less equally effective chemically, will be too expensive for practical use. Mixtures of one or more of these materials may be used, as when dolomite is used as a carbonate for regenerating the metal halide solution and the metal halide solution comprises a mixture of magnesium and calcium chlorides.

Figure 2:
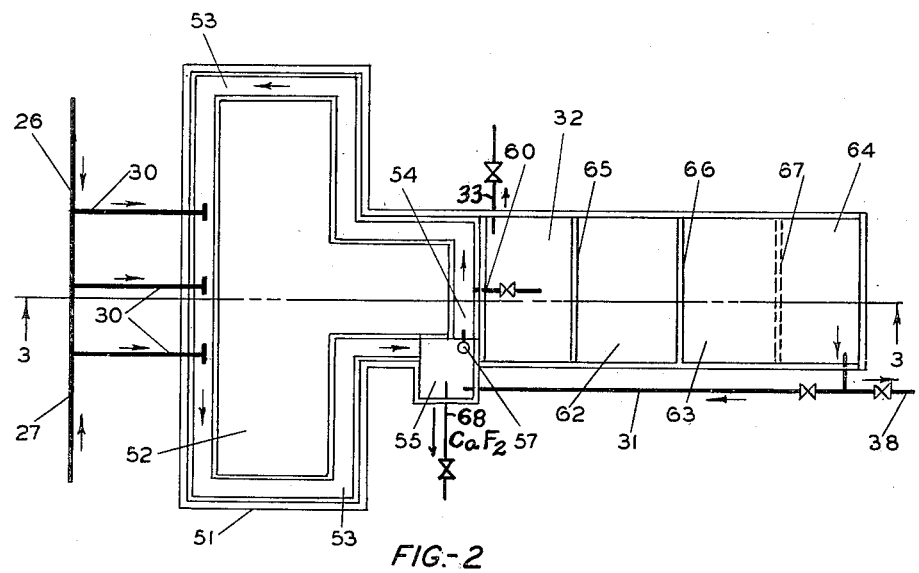
Figure 3:
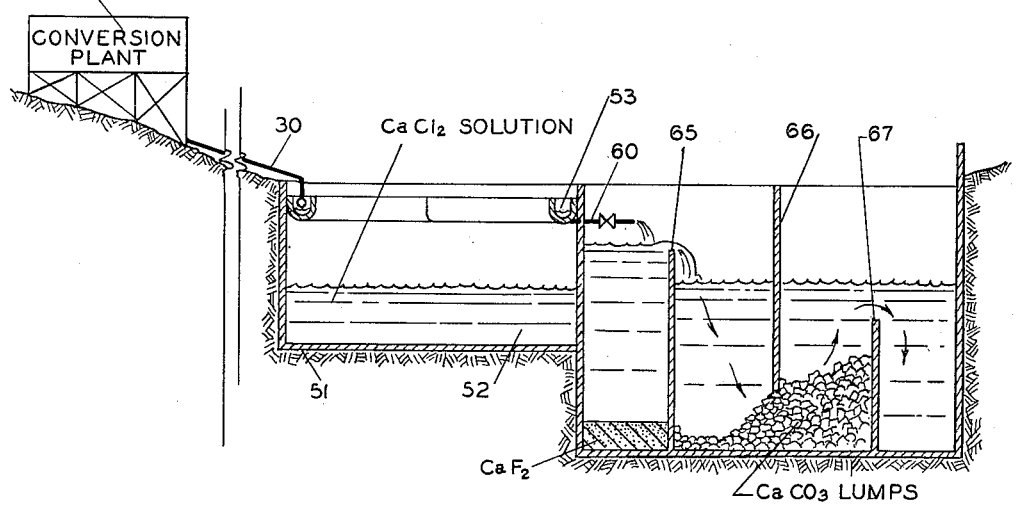

My invention will now be described in connection with the accompanying drawings which form a part of the specification and which illustrate the invention diagrammatically. Figure 1 is a flow sheet representing the manner in which my invention may be applied. Figure 2 represents a neutralization pit which can be used in the practical application of my invention, and is a plane view of the same not drawn to scale. Figure 3 is a cross-sectional view of the pit shown in Figure 2 taken on the line 3—3 looking in the direction of the arrows, and includes also a diagrammatic representation of a conversion plant showing its relationship to the neutralization pit.

Referring now to Figure 1, a hydrocarbon charge to be converted is passed to reactor 10 through line 11 and a fluoride catalyst is passed to reactor 10 through line 12. When the conversion to be carried out in reactor 10 is one of isomerization the hydrocarbon charge will generally be a paraffin such as normal butane or a low-boiling liquid paraffinic hydrocarbon material having a low octane number, and the fluoride catalyst will be hydrofluoric acid, preferably with a minor amount, such as not more than about 10 per cent by weight, of boron trifluoride. When the conversion is one of alkylation the charge will generally be an alkylatable hydrocarbon such as a paraffin or an aromatic hydrocarbon, or other alkylatable organic compound, together with an alkylating reactant such as an olefin, an alcohol, an alkyl halide, or the like, and the catalyst will be concentrated hydrofluoric acid or a complex of boron trifluoride such as hereinbefore mentioned. Similar arrangements can be used in isomerizing paraffins or cycloparaffins. When the conversion is one of polymerization the charge through line 11 will be an olefin to be polymerized, and the catalyst will be boron trifluoride or a complex thereof such as hereinbefore mentioned. Effluents of the reactor 10 are passed through line 13 to separator 14 wherein a separation is effected between the fluoride catalyst and the organic material, such as the hydrocarbon product of an alkylation, and unreacted hydrocarbons. The catalyst is removed from separator 14 through line 15 and may be passed, at least in part, back to the reactor through line 16 and may be discharged, at least in part, through line 17 for regeneration in equipment not shown. The organic products of the reaction are passed through line 20 to separating means 21 wherein a separation is effected into suitable product fractions which can be recovered through lines 22 and/or 23, recycle fractions which may be returned to the reactor 10, as through line 24, and fractions of undesired materials such as light gases discharged through line 25. The organic material passing through line 20, will generally have associated with it a small amount of the fluoride catalyst dissolved or entrained therein so that at least some of the equipment used in separating means 21 will contain active fluoride catalyst. Thus when hydrocarbons are being converted with a hydrogen fluoride catalyst the first piece of equipment used in separating means 21 is generally a fractionating column wherein hydrogen fluoride is removed as a low-boiling product.

It will be readily appreciated that the process so far described in connection with Figure 1 will involve the use of many individual pieces of equipment which are well known to the art such as pumps, reaction vessels, valves, separators, heaters, coolers, condensers, accumulators, fractional distillation columns, etc. From any one of these pieces of equipment which contain a fluid fluoride catalyst such a catalyst may escape to the detriment of the operating personnel and, if the equipment has been properly designed, suitable pipes or conduits will be provided for prompt removal of such escaping catalyst to neutralization equipment. Thus, from reactor 10 gaseous catalyst which has escaped from equipment may be passed through line 26 or liquid catalyst may be passed through line 27. From the equipment in separating means 21 gaseous catalyst may escape through line 28 and liquid catalyst through line 29. The lines 27 and 29 may comprise not only closed pipes, but also open troughs along the ground into which escaping catalyst may flow as a liquid, as when a non-volatile liquid catalyst is used, or as when contaminated equipment is flushed with water. In some cases of emergency it may be desirable to dump rapidly the entire contents of a piece of equipment as when reactor 10 is dumped through line 129.

The escaping catalyst may be passed by these various lines to a common line 30 where it is promptly and thoroughly contacted with a neutralizing solution such as hereinbefore discussed, which for the purpose of illustration, may be considered to be calcium chloride. As previously mentioned the neutralizing solution should be available in sufficient excess that a substantial amount of the neutralizing chemical will remain unreacted. Thus, an excess of aqueous calcium chloride is passed to line 30 through line 31. A portion of the resulting mixture may be recirculated through line 31 and a further portion, or all, is passed to a separator 32 in which solid calcium fluoride is removed and can be discharged from the system through line 33. The resulting aqueous solution will comprise unreacted calcium chloride and hydrogen chloride formed in the reaction. This solution is passed through line 34 to regenerating equipment 35, although a portion thereof may be passed through line 40 to the closed circuit of line 31. To this regenerating equipment is added, through line 36, calcium carbonate, generally in the form of crude limestone, which reacts with the partially spent solution to form additional calcium chloride and release carbon dioxide which can be removed, as through line 37. The regenerated calcium chloride solution is then passed back to line 31 for re-use in neutralizing additional escaping catalyst. The initial calcium chloride solution may be made up in any manner which is most expedient, as by crude commercial calcium chloride, or by reaction of hydrogen chloride with limestone. This original solution, or any desired make-up solution, may be introduced through line 38. If desired, excess water which accumulates in the system may be eliminated by discharging, through line 39, a portion of the solution flowing through line 34. However, since this solution contains hydrogen chloride it may be found desirable to neutralize it before discharge and discharge excess solution through line 38.

It will be appreciated that the neutralization process described in connection with Figure 1 can be carried out in apparatus which can be readily designed, by one skilled in the art, including pumps to insure the material flows discussed. However, I have found that the specific apparatus which is to be described in connection with Figures 2 and 3 is simple and cheap to construct and maintain, and is quite efficient in the practice of my invention. In utilizing this last mentioned equipment the conversion plant 50, which will comprise all of the equipment containing a fluid fluoride catalyst which might escape, is located within a depression having a sloping floor which will direct all liquid material to a pit 51 which is located at the lowest point of the depression. This pit is preferably lined with a non-absorbent material, such as specially treated concrete, which will not react with nor absorb the catalyst. This pit contains a central reservoir 52 containing an aqueous solution of a metal halide which, for purposes of simplified discussion, will be considered to be calcium chloride. This reservoir 52 is surrounded by a trough or flume 53 through which flows a stream of aqueous calcium chloride from a point 54 to a point 55, which comprises a sump or well. To the trough lead lines 30 by means of which escaping catalyst may be introduced into and thoroughly mixed with the circulating calcium chloride solution. In sump 55 calcium fluoride is allowed to settle and is removed from the circulating calcium chloride solution through line 68. Simple pumping means 57, such as a centrifugal pump or an airlift pump, removes solution from the sump 55 back to the higher point 54. A portion of the circulating solution is removed from flume 53 through a passageway, or weir, 60 for regeneration. The regeneration portion of pit 51 is divided into compartments 32, 62, 63, and 64 by baffles 65, 66 and 67. Compartment 32 is a settling basin in which precipitated calcium fluoride, not removed from the circulating solution in sump 55, settles and from which it may be removed, as through line 33. Between baffles 66 and 67, in compartment 63 is placed a mass of granular limestone. The solution to be regenerated passes over baffle 65 under baffle 66 into contact with limestone with which it reacts, then up over baffle 67 to compartment 64 and is returned to the sump 55 by line 31.

The pit should be so constructed that any water flowing along the surface of the ground will be diverted into the flume 53. The pit, if desired or necessary, can be protected from excessive dilution during a rainfall by adjustable dams, not shown. Central reservoir 52 of calcium chloride solution is available for instant use when an excessive amount of catalyst passes into flume 53 so that the liquid in this flume overflows. Such a provision is necessary to handle the large amounts of catalyst which may result from an emergency dumping of a vessel containing a substantial amount of catalyst. At any time any desired portion of the solution, or of any precipitate, in 52 can be removed by adequate pumping means, or the like, not shown. The pit should also be provided with adequate drainage means for removing any oil which may tend to accumulate on the surface of any of the liquid pools thereof, especially compartment 62.

It will be readily appreciated that my invention has numerous embodiments and that various modifications thereof may be applied and practiced by one skilled in the art without departing from the spirit of the teachings or from the scope of the claims.

I claim:

1. In a process for rendering innocuous a fluid fluoride catalyst which has been used in the catalysis of an organic reaction and the activity of which is to be immediately and effectively destroyed, the steps, in combination, of maintaining a cyclic flow of a stream of an aqueous solution of a halide, other than a fluoride, of a metal of the group consisting of magnesium, calcium, strontium and barium, adding said used fluid fluoride catalyst to said stream at a point in said cycle; then dividing the resulting solution into two portions; continuing one of said portions in said cycle; withdrawing the remaining portion from said cycle; separating solid metal fluoride from said withdrawn portion; then adding solid carbonate of said metal to said withdrawn portion in excess to neutralize hydrogen halide therein, to provide additional metal halide therein and to provide in said cyclic flow stream, when said withdrawn portion has been returned thereto, metal halide in excess of that required to react with said used catalyst added thereto; and then returning said withdrawn portion to said cycle.

2. The process of claim 1 wherein said fluid fluoride catalyst comprises hydrogen fluoride, said aqueous solution is a solution of calcium chloride, and said solid carbonate is calcium carbonate.

3. A process of claim 1 wherein said fluid fluoride catalyst comprises hydrogen fluoride, said aqueous solution is a solution of magnesium chloride and said solid carbonate is magnesium carbonate.

4. The process of claim 1 wherein said fluid fluoride catalyst comprises boron trifluoride, said aqueous solution is a solution of calcium chloride and said solid carbonate is calcium carbonate.

5. The process of claim 1 wherein said fluid fluoride catalyst comprises boron trifluoride, said aqueous solution is a solution of magnesium chloride and said solid carbonate is magnesium carbonate.

6. In a process for rendering innocuous a fluid fluoride catalyst, comprising a compound of fluorine and an element other than hydrogen, which has been used in the catalysis of an organic reaction and the activity of which is to be immediately and effectively destroyed, the steps, in combination, of maintaining a cyclic flow of a stream of an aqueous solution of a halide, other than a fluoride, of a metal of the group consisting of magnesium, calcium, strontium and barium, adding said used fluid fluoride catalyst to said stream at a point in said cycle; then dividing the resulting solution into two portions; continuing one of said portions in said cycle; withdrawing the remaining portion from said cycle; separating solid metal fluoride from said withdrawn portion; then adding solid carbonate of said metal to said withdrawn portion in excess to neutralize hydrogen halide therein, to provide additional metal halide therein and to provide in said cyclic flow stream, when said withdrawn portion has been returned thereto, metal halide in excess of that required to react with said used catalyst added thereto; and then returning said withdrawn portion to said cycle.

7. A process according to claim 6 wherein said fluid fluoride catalyst comprises boron trifluoride, said aqueous solution is a solution of calcium chloride and said solid carbonate is calcium carbonate.

8. The process of claim 6 wherein said fluid fluoride catalyst comprises boron trifluoride, said aqueous solution is a solution of magnesium chloride and said solid carbonate is magnesium carbonate.

ANTHONY J. KILLGORE.

REFERENCES CITED

The following references are of record in the file of this patent:

UNITED STATES PATENTS

| Number | Name | Date |
|---|---|---|
| 1,329,072 | Chase | Jan. 27, 1920 |
| 1,339,519 | Lasher | May 11, 1920 |
| 1,924,127 | Lofland | Aug. 29, 1933 |
| 2,007,799 | Gloerson | July 9, 1935 |
| 2,031,554 | Torchet | Feb. 18, 1936 |
| 2,068,640 | Baumbauer et al. | Jan. 26, 1937 |
| 2,141,773 | Strathmeyer | Dec. 27, 1938 |
| 2,142,406 | Nonhebel et al. | Jan. 3, 1939 |
| 2,167,358 | Gleason | July 25, 1939 |
| 2,333,649 | Grosse | Nov. 9, 1943 |
| 2,341,567 | Moriarity | Feb. 15, 1944 |
| 2,371,759 | King | Mar. 20, 1945 |
| 2,384,258 | Oberfell | Sept. 4, 1945 |

FOREIGN PATENTS

| Number | Country | Date |
|---|---|---|
| 16,193 A. D. 1910 | Great Britain | Jan. 3, 1937 |

OTHER REFERENCES

Mellor, Comprehensive Treatise on Inorganic and Theoretical Chemistry, vol. 3, page 698; vol. 4, pp. 296–298 (1923 editions), Longmans, Green & Co., N. Y.

Roscol and Schorlemmer, Treatise on Chemistry, vol. 2, page 529, 1907 edition, McMullan & Co., London.